United States Patent [19]

Ho

[11] Patent Number: 4,981,743
[45] Date of Patent: Jan. 1, 1991

[54] OVERCOAT COMPOSITION FOR OPTICAL RECORD

[75] Inventor: Wu-Jing Ho, Reseda, Calif.

[73] Assignee: Unisys Corporation, Detroit, Mich.

[21] Appl. No.: 223,485

[22] Filed: Jul. 25, 1988

[51] Int. Cl.⁵ .............................................. B32B 3/02
[52] U.S. Cl. ...................................... 428/64; 428/65; 428/76; 428/913; 369/284; 369/288; 346/766; 346/135.1; 430/945
[58] Field of Search .................... 428/64, 65, 913, 76; 369/284, 288; 346/766, 135.1; 430/945

[56] References Cited

U.S. PATENT DOCUMENTS 4,463,083  7/1984  Kitajima et al. ................... 430/273
4,492,718  1/1985  Mayer et al. ....................... 427/160
4,522,846  6/1985  Mayer et al. ....................... 430/321

*Primary Examiner*—Patrick Ryan
*Attorney, Agent, or Firm*—John J. McCormack; R. S. Bramson; Mark T. Starr

[57] ABSTRACT

This disclosure concerns protective overcoatings for an information storage record which includes an information-layer adapted for optical data recording. The protective overcoatings are transparent to recording radiation and especially adapted to enhance service life and recording characteristics.

A typical coating comprises the polymerization product of a formulation including at least one radiation-cured "bulk resin" (e.g, an acrylated epoxy or an acrylate monomer or pre-polymer), plus an associated non-yellowing photo-initiator, a non-yellowing adhesion-promoter and related coating-constituents.

Once applied, this coating is cured by exposure to UV radiation such as to cure it without heating it significantly so that said radiation functions as the sole or principal polymerizing agent, acting quickly, and with little or no supplemental heat, and without extended "tackiness". This formulation will readily "level" to render the desired coating to serve as a mechanical/-chemical barrier.

4 Claims, 3 Drawing Sheets

ABSORBER e'
SPACER d'
MIRROR c'

OVERCOAT COMPOSITION FOR OPTICAL RECORD

This is a continuation of application Ser. No. 544,756 filed Oct 24, 1983, now abandoned.

The present invention relates to a novel information storage record, and more particularly to such a record including an information-layer adapted for optical data recording which has protective overcoat means and related coatings adapted to enhance service life and recording characteristics.

INTRODUCTION, BACKGROUND

Optical storage of digital data is a relatively volatile technology now, being concerned with the storage and retrieval of digital information utilizing optical techniques and using a special related (ODD, "optical digital data") medium, such as an ODD disk. By analogy such data is conventionally stored on magnetic media like tapes or disks commonly used with high speed digital computers today.

Here described are some novel approaches to making rendering protective coatings over a sensitive optical recording medium—e.g., one resisting oxidation or like environmental degradation, wherein sensitivity is improved, extended life is feasible and fabrication parameters are simplified over what is now conventional.

Various types of protective overcoatings for such media have been suggested by workers, especially relative to "tuned media" (e.g., media using a "dark mirror" effect; for instance see U.S. Pat. No. 4,222,071 to Bell, et al; also see "Review of Optical Storage Media" by Zech, SPIE Vol. 177, Optical Information Storage, 1979, page 56, et sequ.; also see "Optical Recording Media Review" by Bartolini, page 2, et sequ. of 1977, SPIE Vol. 123, "Optical Storage Materials and Methods"; and see "Melting Holes in Metal Films for Real-Time High Density Data Storage" by Cochran and Ferrier, SPIE Proceedings, Aug. 1977, pages 17–31; and other citations below).

Extended Archival life

Optical data storage technology is attractive because it promises increased storage capacity. An optical data disk as here contemplated will be assumed to store information thereon for an extended archival life; the goal is 3–10 years or more under typical, and extreme, service conditions for data processing (DP) apparatus. Such extended life is a goal as yet unattained in the art, though workers have long striven towards it. The present invention points toward improved ODD media better adapted for such archival life; media which are especially adapted for "optical mass memory" and like applications, with emphasis on improved overcoat means.

Thus, as a feature hereof, we contemplate the use of a novel overcoat structure and materials for records which preferably exhibit extended archival life, i.e., records which are made extremely resistant to oxidation or like environmental degradation during typical DP storage and use (thus, with little or no "loss" of recorded information occurring over extended storage life, with reflectivity remaining stable enough to "read") —something no practical storage medium or associated system can yet provide; especially where "good" sensitivity is also required. The invention teaches means toward this end.

Overcoat; generally

The typical recorded spots ("bits") are contemplated as being about one micrometer in diameter. But surface "dirt" (e.g., oil, fingerprints) or particulate contaminants, such as air-borne dust, are this large, or larger, and thus can obstruct a recorded "bit". For instance, common smoke particles can be about six microns (6 um, or about 240 microinches) in diameter. Consequently, such contaminant particles will commonly "mask", and so obliterate, recorded "bits" (data) if one or several of them sits just above on the overcoat.

So, it has become conventional to specify a thick overcoating layer for defocusing such contaminant particles and all smudges, spots or smears—e.g., here, by providing a transparent overcoating on the order of 100 to 180 micrometers thick. Thus, any dust particles that do settle on the surface of such a protective layer, (and are not wiped-away) will be "defocused"; i.e., thrown out of the focal range of the objective used to detect recorded data and the rest of the optical train —optically they "disappear". As a second purpose, such an overcoat should provide mechanical protection for the recording layer and prevent damage from handling, etc. (e.g., during fabrication, testing or service).

Now, in some cases, workers have suggested relatively "hard" materials as a protective transparent overcoat, while in others they have proposed "softer" materials. For instance, some have suggested an elastomer outer-coat (cf a silicone rubber like "Silastic RTV" by GE—see U.S. Pat. No. 4,101,907, to Bell, et al where an "ablatable" absorber, such as certain organic dyestuffs, was overcoated with a "barrier layer" of $SiO_2$, or of derivatives of sucrose or resin acids; and this supercoated with such a silicone resin). But known overcoatings of soft, resilient (rubbery) materials have characteristically exhibited a "tacky" exposed surface which readily attracts and retains dust; and in certain instances, such "elastomeric" coatings still seem to "constrict" the underlying absorber. Also, elastomers may require a curing temperature that is too high; or, if they cure at room temperature it may take far too long; yet, when heated for "quick curing" they present a serious risk of overheating the tri-layer (—a silicone elastomer like RTV presents all these shortcomings, along with cure-stress, and excessive moisture-uptake in service).

On the other hand, other workers have considered a "hard" outer "sealing" overcoat applied directly over the absorbing layer (e.g., see "Optical Disk Systems Emerge" by Bartolini, et al IEEE Spectrum, August 1978, where, in a "tri-layer" structure, $SiO_2$ is specified above and below a titanium absorber); yet they have been forced to concede that, such a hard overcoat (perhaps because it unyieldingly confines and constricts the absorber) appears to degrade recording sensitivity, to the point where it renders an otherwise acceptable recording medium essentially "unrecordable". Also, hard outer coatings like $SiO_2$ are too absorptive (e.g., of water vapor) to be long-lived.

"Hard/Soft" overcoat:

A salient aspect of this approach is to provide an overcoating which avoids most or all of the foregoing shortcomings, doing so by providing a two-part overcoating made up of a "soft pad" inner layer and a "hard" outer sealing layer—i.e., with a "Hard/Soft" overcoat. The relatively softer inner pad is intended to be placed against the absorber, to be yielding and quite compressible (as a "mushy cushion") allowing the subjacent absorber to distort and/or move during write-heating, while also providing good thermal insulation (very low thermal conductivity; relatively low specific heat). In short, this "soft pad" seems to better isolate the absorber, mechanically and thermally; on the other hand the "hard" outer coat gives optimal mechanical protection (e.g., a seal against vapor entry). Of course, such layers should also inter-bond well, be highly transparent to the contemplated read/write wavelengths and preferably be convenient and inexpensive to apply.

As mentioned, the mechanical properties of certain such "soft pads" (e.g., of a fluoro-polymer, see below) appear to better accommodate motion or deformation of the underlying absorber during "write-heating" (e.g., as a "top pad"; also as a "bottom pad" if the soft material is used as a "spacer" too). Such "soft pads"—evidently because they so decouple the absorber, mechanically and thermally, from its surrounding environment —are found able to markedly increase "sensitivity" (e.g., well over what can be expected using only a "hard" overcoating like fused silica—i.e., the latter will require more energy to "write" a given bit or "hole"). A "soft pad" is so effective as such isolation that even where only used as a subjacent "spacer" (e.g., with $SiO_2$ directly over absorber) it has been seen to enhance sensitivity (e.g., vs. replacing it with an $SiO_2$ spacer).

And, as mentioned below, such a "soft pad" coating may, in certain cases, be applied with essentially the same facilities as those used to deposit the (reflector and) absorber layer (e.g., during a related, succeeding deposition step, and with common equipment). The consequent convenience and reduced cost, time, etc., will be evident.

And, advantageously, it is often possible to use the same "soft pad" material for both sides of an absorber (i.e., as spacer and overcoat). One may choose from a class of plasma polymerized polymers in some instances, such as polyvinyl fluoride (PVF) other fluorinated polymers such as fluorinated ethylene polymer (F-P), or polyethylene (P-e). Preferably, one evaporo-deposits such a "soft pad" layer at the same time, and with the same equipment, as that for depositing the absorber layer (and/or the spacer layer). Alternatively, one may in certain instances deposit otherwise, such as by plasma (polymerization) deposition.

The thickness of this "soft pad" overcoat is preferably such as to so decouple the absorber layer (thermally and mechanically) from any supercoating (especially a "hard" layer applied over the "soft pad")—and also to bond favorably with the underlying absorber (e.g., so that sensitivity is not badly compromised and so the absorber is suitably "decoupled" from a hard "outer" overcoating, while also preventing the hard overcoating, and/or any stress therefrom, from constraining the absorber and so interfering with pit-formation therein—yet bonded well enough to the "hard" coat to prevent "delamination", moisture intrusion, etc., in service, these easily upsetting the needed optical properties—cf. a mere 100 A° shift can destroy the required "tuning").

It is important to protect the absorber from any such deleterious effects; for instance, especially where one uses absorbers which deform and/or are displaced in the course of recording and creating a "bit-spot". It will be apparent to workers that a hard overcoating (e.g., SiO or $SiO_2$ as known) applied directly on the absorber layer can be expected to constrict it, and restrain such deformation or translation during "bit-writing"—thus interfering with bit formation and degrading sensitivity and recording efficiency, so that more write-energy is needed. Also, most silicon oxides absorb too much moisture. We have experienced these problems using $SiO_2$ (evaporo-deposited on a "cool" substrate)—much less so with materials like the preferred fluoropolymers (cf these can be deposited as relatively "non-porous" films under like circumstances).

Workers will see how important and useful a proper "soft pad" of the type described can be, especially where one wants to enhance the recording efficiency of an adjacent OD absorber layer. Thus, it will usually be desired to so provide a "soft pad" coating over an absorber layer and, where possible, to do so using common deposition techniques (—whether or not one also provides a like "soft pad" spacer layer beneath the absorber—whereby one may thermally and mechanically isolate the absorber from interference generated from above and/or below).

It will be recognized that this involves so applying a (fluoropolymer) "soft pad" which is sufficiently soft and yielding as to mechanically decouple the adjacent absorber layer, freeing it to "move" as written, while also isolating it thermally (i.e., to so function, either as a subjacent "spacer" or as an overlying "soft overcoat" or as both). One will thus want to so provide such a "soft pad" spacer using an organic layer which is made strongly adherent to an underlying reflector layer while also being relatively differently adherent to a superposed absorber layer. And one will prefer to provide such a "soft pad" overcoat which bonds to a superposed hard overcoat relatively firmly (but may bond differently to the subjacent absorber).

Novel "Hard" supercoat:

As mentioned above, another salient feature hereof is that the above-characterized "soft pad" overcoat is, in turn, preferably super-coated with a compatible "hard" outer protective layer. When one superposes a "hard" protective overcoating outward of this "soft pad" overcoat it can serve as a good vapor barrier, and as a mechanical "cover" and an anti-static surface, as well as to complete the necessary optical thickness for "defocusing" surface contaminants i.e., yield a "Hard/Soft" overcoat.

And, as a more specific fracture, a family of novel "UV cured acrylic-epoxy polymers" is here taught for such a "hard" outer coating for an archival OD (optical data) disk; also, a preferred associated novel method is taught for coating such disks with such material. These Acrylated epoxy polymers will be relatively clear (to recording/read beams) and somewhat flexible in addition to the mentioned "overcoat" requirements—e.g., passing all related environmental tests without delamination, cracking, etc.

A novel pre-polymer formulation is described below (e.g., see Mix T-1); it is intended to provide such a "hard" protective overcoating for such OD disks (extended archival life, etc.) and especially as a super-coat over such a "soft pad" overcoat. More particularly, it is intended to provide a "clear" coating (transparent at the contemplated R/W wavelengths), of a thickness to help "defocus" surface dust, etc., (e.g., up to 6–8 mils here) and to provide an environmental barrier against mechanical interference or vapor intrusion (especially water, aqueous aerosols, sulfates or NaCL or other chlorides). It is intended to so function rather like known overcoatings (of a "glass" for instance), and to provide good mechanical protection, (e.g., allowing one to lightly squeeze the disk, though it need not resist a positive cutting action, such as scraping with fingernail.

Known "hard" outer-coatings:

Workers in this art have considered various materials for similar protective coatings. For instance, it has become common to suggest a "glassy" form of overcoat, such as with "fused silica" ($SiO_2$, or SiO) but for present purposes (OD disks, etc.) these seem to be disqualified. For example, they are typically highly porous and can take-up too much moisture; thus they are too prone to swell and crack (especially under the mentioned extreme temperature/humidity cycling tests)—also such moisture contaminants badly degrade optical characteristics. Also, they are not optimal for the desired vacuum-evaporation deposition (e.g., impractical to so deposit several mils or more).

Besides such inorganic overcoatings, workers have considered certain organic materials for providing protective overcoats in similar situations. For instance, as mentioned, some workers have considered using a silicone rubber or like elastomeric polymer for this—e.g., some silastics which may be conveniently curable at room temperature, typically liberate harmful contaminants like acetic acid during cure, (or see "plastic sheet" of U.S. Pat. No. 4,334,233).

In a similar vein, we have considered using various fluoropolymers; but, in the thicknesses contemplated (6 to 8 mils) typical fluoropolymer deposition methods are not favored—e.g., typically require dissipating too much solvent (see problems below with solvent dissipation and associated shrinkage, etc.). More seriously, this could involve a cure-heating which is entirely too intense (at about 390° C, ), whereas the subject OD disks and associated coatings are not intended to survive more than about 66° C. (e.g., otherwise their coatings, such as the organic soft fluoro-polymer overcoat and the absorber layer, would be destroyed, and/or constituents could migrate, etc.). Moreover, such polymers are apt to exhibit a "tacky", dust-retaining, surface and are not believed optimally transparent at the subject read-/write wavelengths (cf. 600–900 N. meters).

Also considered for such a hard protective overcoat were various "solvent-based" (solvent-applied) polymers like epoxy. However, drying (curing) these involves dissipating relatively large proportions of solvent, with a great deal of problematical shrinkage likely. This has seemed to disqualify these materials, especially for coatings as thick as those contemplated (also, bubbles, etc., would probably form in such a thick coating of these materials).

Also contemplated were various "two-component curing" polymers such as "RTV-6" (by GE)—or epoxy. However, these are somewhat difficult to apply, typically having a relatively high viscosity (possibly requiring problematical heating or dilution to soften enough for quick, smooth application—e.g., dilute certain RTV: example, Sylgard 184 and Dow Corning 200); they also typically present "out-gas" problems; further, many cure relatively slowly and at a relatively high temperature (e.g., 15 minutes at about 66° C.—and, even then, the cured material often exhibits a tacky surface and is too apt to scratch, peel-off, etc.). Moreover, such materials typically have too brief a "pot-life" (on the order of one day)—yet another application shortcoming.

The subject preferred radiation-cured epoxy-acrylic polymers do not seem to present the foregoing problems, e.g., they don't require solvents and are cured at room temperature in a short time.

Preferred materials for "HARD overcoat":

Accordingly, the foregoing families of chemical coatings are disfavored. An attempt was made at using a "radiation-cured" acrylic-epoxy type polymer (acrylic monomer, or pre-polymer mix plus epoxy resins with various additives, similar to the "Mixture T-1" discussed below). It was found, somewhat surprisingly, that when properly applied (e.g., see "spiral" technique, below; with appropriate "setting surfactant" and appropriate "solventleveling" , etc.) such an overcoat could satisfy (most, if not all of) the mentioned requirements, whereas other materials seem less apt for doing so. Thus, it is an object of this disclosure to teach the use of such radiation-cured acrylated epoxy polymers as a "hard" protective overcoat for such optical data disks, as well as teaching related methods of preparing and applying them.

As detailed below, a preferred family of hard coat materials—"radiation-cured polymers"—is made up of epoxy plus a number of "acrylated monomers" (or "pre-polymers", i.e., an oligomer or resin that will undergo further polymerization—especially where the principal constituent is a suitable acrylate or acrylamide). A preferred version (Mix T-1) includes an appropriate acrylated epoxide together with an acrylate cross-linker, an acrylate flexibilizer and associated acrylate diluent plus UV-initiator and "clarifying-adhesion promoter", and preferably including a suitable surfactant constituent. Also, a minor portion of the Mix may comprise one or more additives (preferably organics which will participate in the UV polymerization, e.g., α-methyl styrene, vinyl acetate, etc., do this).

Such acrylics are evidently eminently suitable for several reasons: they do not include (any significant portion of) problematic components like ("shrink-prone solvents") and they require no problematic cure conditions (such as extreme heat). They seem to be especially apt for providing a final "Hard" and glossy polymeric overcoat which has the required characteristics.

And, such "acrylic-epoxy radiation-cured polymers" will be recognized as satisfying essentially all the other cited requisites of the desired "Hard overcoat"; i.e., they don't readily crystallize, they have no massive solvent content or associated shrinkage problems, they are cured quickly and conveniently and without excessive heating; and they are relatively easy to apply (e.g., as a low-viscosity solution). They appear quite superior in resisting degradation and attack by common environmental components; they are not "tacky" or dust-retentive, and, unlike the ("two-component-cured") polymers, they are compatible with a wide number and variety of additives (e.g., their curing is not affected thereby, as seen in the Examples below).

Workers will recognize that the required cure-radiation may be something as inexpensive, quick and convenient as a few seconds exposure to a UV source (of appropriate λ, intensity, etc.) and involve as little as a few % shrinkage. Or, where cost is not a major concern, one may instead cure with electron-beam or gamma radiation.

Alternatively, a UV activated epoxy derivative (catalyst) cure may be feasible. And, whatever the primary curing mode, it will be understood that light supplemental heat may, in certain cases, be so applied to hasten complete curing.

Application as "spirals"

According to a related feature, such acrylic-epoxy overcoat polymers are apt for application in a spiral configuration on a host substrate-disk, being evenly distributed thereon (e.g., with appropriate disk rotation and inclusion of an appropriate leveling agent), and allowed (or in some cases induced) to settle and flow-out evenly. This is seen to spread the mix across this surface with exceptional smoothness and uniform thickness. Workers in the art will recognize the simplicity and novel advantages of such a coating technique.

Thus, it is an object hereof to provide the foregoing, and other related, features and advantages. A more particular object is to do so, teaching the use of "soft pad" materials adjacent an "optical recording layer" with a relatively "Harder" supercoat on the soft pad. Another object is to teach such for improved recording sensitivity, adequate for low-power lasers; as well as for extended service life. A further object is to teach preparation of such a "Hard" supercoating using acrylated epoxy materials. Another object is to provide such "hard" overcoatings and associated preferred materials.

BRIEF DESCRIPTION OF THE DRAWINGS

These and other features and advantages of the present invention will be appreciated by workers as they become better understood by reference to the following detailed description of the present preferred embodiments, these being considered in conjunction with the accompanying drawings, wherein like reference symbols denote like elements.

Figure 1:
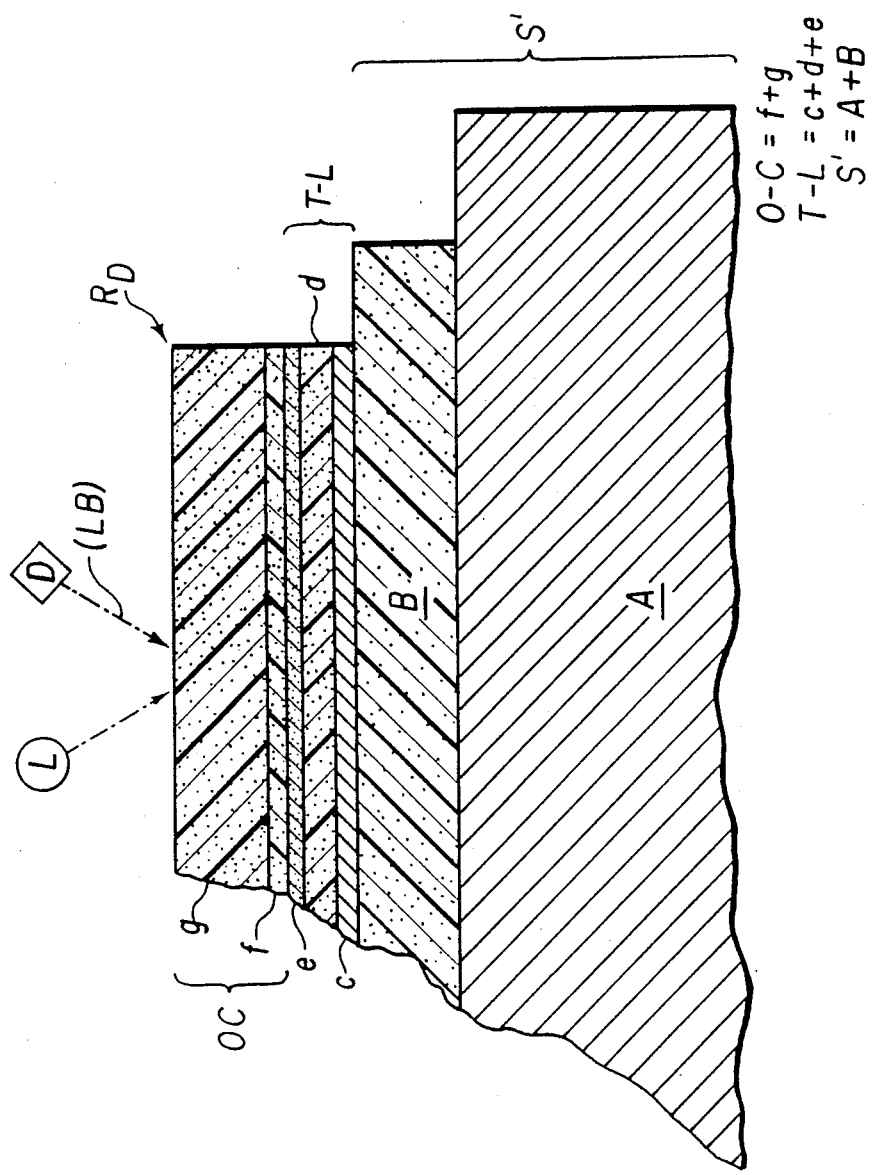
FIG. 1 provides a cross-sectional view of a recording medium embodiment exhibiting a construction in accordance with features of the present invention.

Exemplary OD recording—Example I (FIG. 1; tri-layer with "overcoat"

FIG. 1 will be understood to (schematically and in idealized fashion) depict a fragmentary section of an optical data disk $R_D$, including a substrate disk A supporting a recording tri-layer T-L and overlying protective overcoat O-C. Disk $R_D$ will be understood as intended and adapted for recording by a known radiation source (Laser L) directing a beam (LB in phantom) at a tri-layer T-L so as to record certain bits therein—these to be "read" using prescribed associated detect (D), as known in the art.

The wavelength of the reading laser beam (LB of FIG. 1) is chosen so that unrecorded regions of the disk $R_D$ exhibit the desired anti-reflection condition; read-beam intensity will be kept low enough so as to not disturb the integrity of data recorded on the disk. Substrate A preferably comprises a relatively conventional magnetic recording disk with a smoothing layer B, applied thereon as necessary. Tri-layer T-L preferably comprises a transparent spacer layer d atop a reflector film c, with a suitable absorber or recording film e superposed on spacer d.

It will thus be understood that the reflected read-beam will be intensity-modulated by optically detectable changes at bit sites where data was recorded. Thus, the read beam will experience relatively high reflection when incident on a "bit" and relatively low reflection when incident on unwritten regions. Protective means O-C is a Hard/Soft composite overcoat chosen and arranged so that dust particles on its upper surface will be displaced far from the focal plane of the optical system (i.e., placed out of focus); and so have a negligible effect on the recording and reading operations.

It is conventionally assumed that, for the laser beam to "write" (i.e. "record" and produce an optically detectable disturbance in the reflectivity of the thin film absorber layer c) absorber film e, at any given bit-site, must be heated to a prescribed (minimum) write-temperature (Tw). The level of minimum temperature Tw is believed to depend on the properties of absorber c (e.g., on its thickness, metallurgy, microscopic structure, etc.) and also on the properties of subjacent spacer d, as well as upon "interface characteristics" between the spacer d and absorber e, and possibly between overcoat O-C and absorber e.

It will be found that a finite time is required for writing at a "bit site" (on which the writing laser beam is here assumed to be focused) to reach this requisite minimum "recording temperature" Tw. But while a "bit site" is being so heated, some of the applied heat is typically assumed to be escaping through underlying dielectric spacer d (also through O-C, possibly) and thus "wasted". To the extent such heat is lost, more time/energy are required to "write" of course, i.e., recording sensitivity is commensurately degraded. It is also believed that such heat-loss can reduce the quality of the recording and thereby reduce "recording density" for a given medium.

"Soft pad" as "Tri-layer-Spacer"; preferred materials

As an optimizing feature, it is preferred to use certain "soft pad" (e.g., fluorinated hydrocarbon polymer) as such a dielectric spacer layer d (FIG. 1). Such a "soft pad spacer" is believed to help reduce the loss of write-energy (i.e., less writing-energy escapes from the bit site).

Preferred materials are fluoro-ethylene) polymer; another fluorinated polymers or copolymers; e.g., those commercially available under the name "Teflon", a trademark of DuPont. Such a fluorinated polymer can be deposited over the reflective layer c in a thin uniform layer as workers will understand.

Preparation of Tri-layer T; (FIG. 1)

About 600–900 A° of a good archival-reflector like gold (prefer about 600 A°, vapor-deposited) is applied as the reflector c atop an aluminum disk A, preferably smoothed properly with a subbing layer B as known in the art. Aluminum may replace gold where reduced cost is required and archivability can be compromised.

The reflector c may be so evaporated under high vacuum, in a large, batch-coating chamber with corresponding large coating distances and "double-rotation" of substrate etc., to better ensure uniformity. All dust and stains on parts should be reduced to a strict minimum, using rigorous "Clean Room" techniques.

The spacer d is similarly deposited atop reflector c. Under present practice spacer d serves as a dielectric material which is relatively transparent to the "working portion" of the laser spectrum. A one-quarter wave (of laser L) thickness of "soft pad" fluoropolymer is preferred, for the subject purposes (e.g., assume write/read at $\lambda = 6328$ A°; Note: from an optical standpoint, a spacer of thickness $t_s = \frac{1}{2} n \lambda r$, will "disappear").

Absorber layer e may be understood to comprise an ultra-thin layer of gold which is vapor deposited (thermally evaporated) in island form onto spacer layer d (on a relatively flat—$\sim \leq 1/20 \lambda$—record surface thereof—as contrasted with a more conventional absorber of tellurium—e.g., see "Optical Properties of Tellurium Films Used for Data Recording" by Ash and Allen, SPIE Proceedings, #222, 1980; and see "Design and Production of Tellurium Optical Data Disks" by Rancourt, SPIE Proceedings, #299, 1981; or see U.S. Pat. No. 4,222,071 or U.S. Pat. No. 4,334,299).

Here, test recording will be assumed as performed with a gas (He-Ne) laser beam operating at 6328 A°, with recording exposure from 30-470 n.sec [usually 10 mW, 40 n.sec or about 400 p.J.—this intended to yield minimum adequate read-out, or about 40 dB S/N, when read at lower power e.g., 150–500 pJ/cm$^2$, where pJ = 10$^{-12}$ watt-sec. or Joules), with the same or similar laser equipment. Note: for this contemplated setup, assume the laser beam is focused on bit site of $\frac{1}{2}$ to 1 micron diameter, (i.e., 5000-10,000, with a write-pulse about 40 n.sec. long—this also accommodating disk rpm of 1800 and associated galvo-mirror focus characteristics].

Thus, the spacer layer d (e.g., in such a "dark mirror" arrangement) will preferably comprise a "soft pad" which is vapor-deposited on a reflector layer, and upon which the absorber (recording) layer may in turn be deposited. This spacer layer will preferably comprise a so-deposited fluoropolymer (e.g., about 1100 A° thick) which is highly transparent to the contemplated read-write wavelengths and which also provides good thermal and mechanical insulation, isolating the absorber layer from the reflector layer, (note the reflector is typically a highly conductive metal which could otherwise function as a heat sink, draining recording energy away from the absorber layer and reducing its effectiveness).

Thus, as further described below, for one example we prefer a (vacuum-evaporated) fluoropolymer, like polytetrafluorocarbon (Teflon) prepared from tetrafluoroethylene by plasma polymerization. Alternatively, PVF may be substituted.

[Note: this will be distinguished from hard silicate coating (silicon oxide or silicon dioxide—cf. "fused silica") more conventionally for such a spacer (e.g., see U.S. Pat. Nos. 4,195,312 or 4,195,313 or 4,216,501 to Bell, et al) or compare "Design and Production of Tellurium Optical Data Disk" by J. Rancourt, SPIE Proceedings; Advances in Laser Scan Technology, page 57, Vol. 299, 1981].

Such a "soft pad" spacer material, including associated deposition methods is especially apt for such OD disks—and even more especially such which are typically convenient for low-energy recording with present laser equipment (e.g., writing with a He-Ne laser in a 5-20 mW/40 n.sec. pulse—cf. 25 MHz rate).

The subject record $R_D$ (FIG. 1) is so-recorded upon. It is found (relating to comparable situations in the literature, etc.) that relatively "moderate-power" laser pulses can heat and agglomerate the gold-island film sufficient to yield good read-out (e.g., bit reflectance of $\sim 50\%$ vs. background of 1-3% at $\lambda = 6328$ A°)—and with relatively no "noise".

Workers will be familiar with present preferred methods for high-vacuum evaporation, and reconstitution on the Al film, of such thin layers of organic materials like the fluoropolymer (cf. cited Rancourt article also re similar deposition).

Fluoropolymers like those preferred are of a generally paraffinic structure, with some or all of the hydrogen replaced by fluorine. Both are sold by DuPont Co. under the trademark "TEFLON". They are highly inert (unaffected by reactive chemicals) and are quite stable chemically and mechanically, under the contemplated extremes of temperature and humidity; they have low dielectric constants and appear to bond satisfactorily.

For present purposes, "Sensitivity" will be understood as characterizing the write-ener $E_w$, i.e., the laser beam necessary to change reflectivity (or a like read-out characteristic) sufficient to give the specified minimum read-out.

The intensity and time exposure of the focused Write-beam here will be understood as sufficient to so elevate the temperature of absorber layer e as to cause the indicated change in reflectivity, giving desired read-out quality, etc. (e.g., so that adequate contrast, S/N ratio) may be realized, as understood by workers in the art, —cf. an exemplary S/N ratio of 40-50 dB (peak-to-peak signal vs. RMS noise) for a bandwidth of about 15 MHz.

Laser recordings are made on the resulting optical medium at 2400 revolutions per minute using apparatus of the general type referred-to in connection with FIG. 1 (above). A Helium-Neon laser is again used for recording (wavelength of 0.633 um). The focused laser beam "spot" on the medium film 98 is approximately 0.5 um. Resulting sensitivity of such recordings will be found to be quite good—better than conventional approaches have led one to expect.

Moreover, the fluoropolymer gives a nice optically clear layer with a relatively low refractive index (about 1.3 vs. about 1.5 for fused silica, a value somewhat higher than optimum).

Alternative deposition by plasma polymerization or other techniques will be feasible in certain instances, as workers will appreciate.

Also, workers will contemplate that other like "soft pad" polymers may be similarly deposited by vacuum evaporation, although the choice will be somewhat limited in view of the subject, rather stringent requirements. The preferred materials and thickness have been found to be quite versatile; for instance, in many cases one may use a different absorber metal without changing the materials or thickness of this spacer (or of the "soft pad" overcoat, as described below).

"Soft pad" as supercoating on absorber

As mentioned, it is preferred to use such a "soft pad" layer as a "buffer" supercoat directly over the absorber layer, e.g., helping to further isolate it thermally and mechanically—especially where a like "soft pad" is present underneath the absorber. For instance, it is believed that this further helps to conserve write-energy, while giving the gold-isle mass more freedom to move or deform while being write-heated (e.g., vs. a conventional silica supercoat which is believed to seriously constrict hole-formation). On both counts sensitivity should be enhanced.

Such was found to be the case as noted below.

In the course of using such a "soft pad" layer (e.g., 9500 A°) as the in-contact buffer supercoat over such an absorber, a salient feature of this teaching is to, in turn, overcoat the soft overcoat with a "Hard" barrier layer of acrylic-epoxy, etc., as specified below. It is believed we determined that such a "soft pad" supercoat should preferably exhibit the following characteristics (Table I):

TABLE 1
("Soft Pad" Supercoat desiderata)

1. Optically compatible: good transparency at $(R/W)\lambda$
2. Good uniform thickness and surface flatness:
3. "Moderate-to-weak" adhesion to absorber: Little or no resistance to "hole writing" and associated deformation and/or movement of absorber - yet no orange peel, lifting, delamination, etc.
4. Strong bond to ("Hard") overcoat:
5. Stable under contemplated environment: (i.e., despite varying temperature and humidity, contaminants, etc.): e.g., surviving service temperature without degrading, even adjacent the hole-formation site; chemically stable too; e.g., no release of solvent or other contaminants during cure or under extended extreme temperature and humidity cycling.
6. Relative "softness": allowing movement/deformation as in #3; (considerably more than "Hard" overcoat) and thick enough to accommodate bit-writing with minimal degradation of sensitivity from overcoating(s).
7. Good thermal insulator: e.g., low thermal diffusivity, low specific heat; survives temperature of fabrication, and of "writing".

Now, others have suggested some kind of polymeric supercoating for such absorbers. For instances, U.S. Pat. No. 4,101,907 mentions "silicone resins" for such (e.g., General Electric's RTV 615 or RTV 602, these curing at room temperature with certain curing agents; or Dow Corning's Sylgard 184—e.g., suggesting these for use over titanium)—preferably with an intervening "barrier layer" of $SiO_2$ or certain complex organic materials.

Alternative "soft pad" embodiments:

Workers will recognize that such a "soft pad spacer" may be otherwise implemented in appropriate instances (e.g., with another relatively "soft", relatively non-reactive, stable, durable polymer such as a like "modified fluoropolymer" or polyethylene, polypropylene or polystyrene—these will typically decompose and polymerize in similar fashion). Likewise for such a "soft pad supercoat".

And, other deposition techniques will, in appropriate cases, be feasible, such as with a plasma deposition technique like glow-discharge (especially for fluoro-carbons) or sputtering, especially where chemical breakdown is not complete. And workers may well change the optical absorber; e.g., to another more compatible, high-sensitivity, thin-film, low thermal conductivity material which also couples properly to the "soft pad". Further, workers will contemplate other like applications and uses of such a soft pad.

Preferred overcoat embodiment; ("Hard/Soft" overcoat O—C)

Disk $R_D$ in FIG. 1 (only small schematic section shown) illustrates a preferred example of the features mentioned above, and especially the (general) teaching of a "Hard" overcoat applied over a "soft Pad" layer covering an absorber (optical recording film)—i.e., a novel "Hard/Soft" overcoating structure O—C (cf. FIG. 1, Hard coat g and soft pad layer f over absorber e, which is part of the ODD "tri-layer" T-L applied on substrate A). It will now be described with reference to this schematic showing.

Except as otherwise specified, workers will understand that (here and for all embodiments) all materials, methods and devices and apparatus herein will be understood as implemented as above or by other known expedients according to present good practice. In the course of this description some variations which could prove useful in certain circumstances will also be pointed out.

Substrate

The substrate is preferably the surface of disk A, as treated, when necessary, with a smoothing or subbing layer B to make its surface sufficiently smooth. Thus, substrate A is preferably a common "Winchester" disk, such as used in commercial magnetic recording disks for computer media. It comprises an aluminum alloy, prepared as is typical for fabricating disks for high speed magnetic recording of digital data (e.g., as used in computer memory systems). The surface of such disks is commonly polished, diamond-turned or otherwise smoothed, as workers well know. Alternatively, a suitable glass or plastic disk may be substituted in certain instances.

"Subbing" layer B will be understood as applied to the bare, well-cleaned disk surface. The "subbing" preferably comprises an organic material to so smooth the microscopic irregularities on the surface of substrate A to well under "hole size" (e.g., about 0.5 um or less in diameter). If the surface is already smooth enough (e.g., if a highly polished glass disk is used), a subbing layer may not be necessary, as workers know.

This substrate is thus understood as preferably comprising a 14"disk to be operated at about 1800 (to several thousand) rpm, with good surface smoothness.

A radiation (laser) beam of prescribed energy and wavelength will be understood as applied to medium $R_D$ from a laser source L (see FIG. 1), being activated and focused at "write time" so as to render a "pit", "hole" or like optical "anomaly" apt for the contemplated read-out on recording layer e in the course of "writing". More particularly, one may, for example, contemplate using a 10 mW gaussian beam with diameter of 0.8 um (i.e., 8000 A°) and scanning at 45 n.sec. to form an optical transition with a certain minimum length and width, e.g., 0.8 $um^2$, though not necessarily square, circular or other prescribed shape. Now, this requirement is too stringent for conventional means, as workers realize (e.g., for archival records).

So, where each "pit" (bit) is recorded, the "anti-reflective" background will be disrupted such as to yield "bit marks" adapted for high-contrast read-back. And, where the recording wavelength is shifted, the spacer thickness is readily altered to give like results. In this "tuned" ("tri-layer" or "Dark Mirror") configuration, surface reflectance (on absorber e) can be made "zero", or other selected value, by adjusting absorber thickness and spacer thickness. (A "tri-layer" being here understood as comprising a transparent spacer with absorber on one face and reflector on the other, thicknesses being adjusted for "optical tuning" as workers will know).

Thus, the coating parameters here will be understood as selected to preferably provide an "anti-reflective" condition for the so-coated disk at the contemplated recording frequency when the write beam is focused on this absorber layer. (Regarding such see above, and also: *"Anti-Reflection Structures for Optical Recording"* by Bell and Spong, Journal of Quantum Electronics, Vol. QE 14, No. 7, July 1978; and, for general prior art, see exemplary articles: "Optical Disk Systems Emerge", IEEE Spectrum by Bartolini, et al, Aug. 1978, page 20; and "Optical Storage Material and Methods", SPIE Proceedings, Vol. 177, Optical Information Storage , 1979, page 56).

Recording portion ("Dark Mirror" type)

The recording face of disk $R_D$ may be visualized as an "absorber layer" (e) together with an appropriate subjacent "spacer layer" (d) and a "reflector layer" (c), below spacer d, as well known in the art. As another aspect of this disclosure, such layers (c, d and e) are preferably applied by successive evaporative coating sequences with appropriate materials in a single high-vacuum chamber, and preferably together with "soft pad" overcoating (f) also as described above.

Alternatively, these applications might be rendered by a suitable plasma polymerization technique or other appropriate methods for producing films of the mentioned type. Workers will recognize, as a feature of advantage here, the teaching of materials and techniques which may accommodate such a series of like deposition steps using a common a deposition apparatus (e.g., especially where spacer layer d and a soft overcoating f both comprise like "soft pads").

Reflector layer c comprises, preferably, a layer of high reflectivity metal such as vapor-deposited gold or aluminum as above discussed; e.g., deposited until layer c is "just opaque" under the contemplated illumination, as viewed through layer c (as workers knowledgable about making evaporated reflectors well know, too thick a reflector will degrade reflectivity). And as workers know, other metals can, at times, be used so long as they provide sufficient high reflectance at the contemplated R/W wavelengths. Another option is to use dielectric films of alternating high and low index and with a quarter-wave reflector.

Spacer layer d, is intended to function, in combination with the reflector layer c and absorber layer e, to reduce the reflectance of the "tri-layer" assembly to zero, or to some other predetermined reflectance value. The materials used will preferably be relatively "non-absorbing" and highly transparent to the contemplated R/W wavelengths. The thickness of spacer d will depend on its optical properties and those of the other layers in this tri-layer. Preferably a thickness of 0.5 to 1.5 quarter waves will be used. Alternatively, multiple half-wave thicknesses can be added as workers will see. (Note: from an optical standpoint, a spacer of thickness $t_s = \frac{1}{2} n \lambda_r$, will "disappear").

Layer e (FIG. 1, still) is the absorbing film in which the working incident "write energy" is to be concentrated.

Overcoat portion

"Soft pad" coating f preferably consists of a convenient thickness (e.g., a few thousand A°) of a fluoropolymer (e.g., preferably and conveniently be the same material and deposition method as for spacer layer d). It is preferably formulated and deposited (on absorber e) as described above, most preferably being laid-down in the same overall deposition sequence; cf. with tri-layer T-L for convenience.

Where using the "tri-layer", it will be convenient to detect and control thickness with layer f being deposited as one or more half-waves. As workers will realize, a number of half-wave thicknesses will make the soft overcoating "disappear" optically, and thus not reflect read/write energy meant for the absorber layer (—this would reduce system efficiency).

"Soft pad" supercoating f will be sufficiently "soft" and yielding to maximize sensitivity, will be relatively non-porous, thermally insulative, with a relatively low specific heat, as well as being highly transparent to the contemplated R/W wavelengths ($\lambda_r$) as mentioned above. Also, it will bond firmly to the superposed "Hard" barrier layer, but couple rather loosely to the underlying absorber (e.g., which preferably will be relatively non-reactive with the "pad")—also a flash inter-coating can, of course, be used. It should also be chemically stable, compatible (not project contaminants in record $R_D$) and able to be matched thermally and mechanically to adjust layers (i.e., to absorber e and hard coat g). Ideally it will also be cost-effective and convenient to apply (e.g., with same deposition methods and equipment as layers c,d,e).

The above-described fluoropolymer material will be found to meet most, if not all, these stringent requirements (as summarized in Table I above), though other like materials (e.g., like plasma polymerized fluoropolymers) will be suitable in appropriate instances. And, when such "soft pads" sandwich an absorber on both sides, the "thermal-mechanical isolation" thus afforded will be recognized as exceptional.

Further treatment of "soft pad" overcoating f may be necessary to optimize its compatibility and bonding to contiguous coatings (e.g.,to enhance adhesion of its exposed surface to the "hard" overcoating and/or to weaken its bond with the underlying absorber layer). For instance, it has been found that certain "promoters" applied to the exposed surface of such a "soft pad" are often preferable for enhancing the wetting, etc., of a hard overcoating g like the radiation-cured acrylics described below. Such a "promoter" can evidently reduce moisture absorption and raise the "surface energy" $E_s$ of the soft pad, and lower the "free energy" of the substrate/coating system. One may prefer to promote wetting and hydroxyl affinity providing related "polar groups" on a TFE or FEP soft..Pad surface (these increasing surface energy $E_s$; e.g., vs. other coatings which raise $E_s$). A methyl methacrylate, or MMA provides such a (compatible) polar group. One may deposit such a "polar strike" by plasma (branching) polymerization (e.g., for 10+ minutes in the case of MMA) or by plasma etching or the like. Alternatively, one may lower $E_s$ and favor coating of such a soft pad via a light transparent "strike" of metal or metal oxide (these raising $E_s$ and improving wetting). As a feature hereof, such "soft pad" supercoatings will be seen to give strong adhesion to a hard supercoat thereon, but be coupled relatively loosely to the underlying absorber layer.

The rest of the overcoating O—C on absorber e (i.e., the outer portion) is made up—according to a related feature hereof—of "Hard" overcoating layer g, comprised of the below-specified acrylic-epoxy. This serves not only to provide outer mechanical protection and the needed defocusing thickness (with pad f), but also serves as a good vapor barrier and anti-static surface. The preferred formulations for hard overcoat g and related preferred methods for preparing and applying such are detailed below.

The thickness of layer g will, to some extent, depend on the optical system used (e.g., correcting spherical aberration in the focusing objective may be involved); it has been found that thicknesses on the order of 200 micrometers are quite suitable for this embodiment.

Results: (Ex. I, FIG. 1)

The "hard/soft" overcoat embodiment suggested above (with the acrylated epoxy as in Mix T-1 below, applied on the "soft pad" with underlying absorber, tri-layer, etc.) will be seen to give surprisingly good sensitivity (e.g., superior to analogous records where a thick $SiO_2$ overcoat overlays the absorber), as well as providing the other desired characteristics mentioned above (e.g., Table I).

Of course, workers will understand that this embodiment is rather generally described, with further particulars of materials, deposition, etc., of the "Hard" and "Soft pad" coatings given elsewhere herein (cf. "Hard" Example II below, etc.).

The Hard/soft overcoating will be recognized by workers as superior to such common (non-composite) coatings as fused silica (e.g., reducing required write-energy, giving longer, better environmental stability and service—especially in respect of moisture uptake).

The "Hard" overcoat resulting not only combines well with the "soft pad" (e.g., bonding satisfactorily thereto); it also exhibits the usual properties expected of such a protective outercoat (e.g., hardness, abrasion resistance, non-tacky), be readily cleaned (e.g., of dust, oil, fingerprints), be clear and transparent to $\lambda_r$ and exhibit low permeability to contaminants like water vapor, oxygen, etc.

Such a Hard coat material is preferably applied by spin-coating (according to present good practice) or by other suitable techniques known to workers (e.g., in certain instances, spray-coating, dip-coating, flow-coating or curtain coating may be feasible alternatives). Radiation-cured acrylic-epoxy coatings like those detailed below will be understood as apt for most such instances.

Other materials for Hard/soft overcoating

Workers will understand that, in appropriate instances, other "soft pad" and/or "hard overcoat" materials may be used to effect some or all of the indicated functionality of the preferred embodiments here detailed. For instance, in certain instances the hard overcoat may take the form of a transparent pre-formed sheet of acrylic-epoxy—laminated onto the "soft pad" or vice versa—in some instances the "soft pad" may also serve as the adhesive for the Hard coat.

Preferred "Hard overcoat" materials

Expanding on the foregoing, we will next describe a family of materials which are especially, and surprisingly, apt for use in protective "Hard" overcoatings like those above discussed (i.e., as a supercoating over a "soft pad" on the OD disk of FIG. 1, etc.). Thereafter, we will describe a preferred novel associated technique for applying such "hard coating" material to an OD disk or like substrate.

Example I-A: ("Hard" coating for Ex. I; Preparation, application, curing)

This Example is intended to describe the preparation and characteristics of a preferred radiation-cured acrylic-epoxy hard coating mixture T-1 as applied to the Example I embodiment (on "soft-pad" supercoat overlying the absorber) and also to describe a general method of applying this to a substrate and then curing it in situ. Later, further details of a particular preferred method for applying this to a prescribed optical data disk will be described (see description below in connection with FIG. 2).

Workers will agree that the desired "Hard" outercoat for such optical disks should not only function as a protective layer (to protect the media from dust contamination and environmental degradation, etc.), but also should have other properties such as high optical transmission, minimum effect on sensitivity and S/N performance of the medium. UV-curable coatings are more acceptable for industrial applications than conventional thermal-cured coatings, e.g., because they have a faster cure cycle, less energy consumption and less environmental pollution (no problematic solvent emission). It should not attract dust (be static-free) should be very "clear" and highly transparent to R/W $\lambda$, very strong, somewhat flexible, adhere well to "soft pad" and not badly degrade optical R/W performance. It should have good mechanical integrity despite humidity/temperature cycling (e.g., not be brittle or easily fracture, no delaminate or curl due to internal stress) and have good abrasion-resistance.

In general, the UV curable coating here will comprise an unsaturated resin, unsaturated monomer and photoinitiator. The formulation of ingredients is "state of the art", but requires a complete understanding of the functions of the constituent parts and their function.

Working at room temperature and otherwise standard conditions, the following "Hard overcoat" prepolymer mixture T-1 is prepared, being intended for application as a "Hard" protective overcoating, about 7-10 mils thick, and having the described characteristics as uniformly spread and cured on a prescribed optical data disk surface.

This surface may be understood as comprising a properly-treated aluminum disk substrate (e.g., with smoothing pre-coat thereon) with a tri-layer optical recording matrix superposed thereon, followed by a plasma polymerized thin, "soft pad" supercoating (of "soft pad" fluoropolymer). Such a fluoropolymer is, thus, the substrate of choice here.

| Mix T-1 | Wt % Pref. | Approx. Range |
|---|---|---|
| "Celrad 3701" (Acrylated epoxy resin) | 36 | 30-40 |
| TMPTA (Tri-acrylated monomer - for cross-linking) | 24 | 20-30 |
| 2-EhA (mono-acrylated monomer; to flexibilize) | 36 | 30-40 |
| FC-430 (Fluoro-carbon wetting agent) | 1 | 0.5-2 |
| I-184 (non-yellowing UV-initiator) | 2 | 1-4 |
| Z-6020 (clarifying adhesion-promoter) | 1 | 0.5-2 |

The Celrad 3701 (Celanese Corp.) will be understood to be an acrylated epoxide "basic" bulk-resin which is readily cured by ultraviolet light (as below) when properly initiated. This basic resin is selected to impart the desired strength and chemical stability to the cured coating over relatively extended service life; and because it very quickly and conveniently cures and yields fairly good clarity. Importantly, it allows relatively little moisture absorption. Also, like all the other constituents it is preferred here because it is generally low-cost, easy to formulate and apply, and because it yields the desired "archival" protective coating (as mentioned elsewhere).

The viscosity of Mix T-1 should be monitored lest it become too thick and viscous to apply readily (see preferred spiral application technique below—e.g., mix must flow through a dispensing nozzle). Also, the cured coating should exhibit little or no water uptake lest it might later tend to swell and crack.

However, since 3701 can tend to discolor slightly over time, it should be used with additives that promote clarification and resist yellowing as noted below.

Workers will recognize that other like, low-viscosity co-monomers (or pre-polymer, low-viscosity diluents) may be substituted, adjusting viscosity accordingly. For instance, certain other Celrad formulations may be suitable in some instances. However, other common coating polymers are not feasible; for instance, acrylated urethane which is prone to cause "orange peel". And other like acrylated resins are not apt for substitution. For instance, Celrad 3200, another acrylated epoxide is apt to induce coating separation, delamination, cracking or fracture (is less viscous, with more flexibility and less tensile strength). And Celrad 1700 (acrylated acrylate) gives similar problems. And moisture-intrusion and shrinkage can be reduced by adding a saturated resin (e.g., a derivative of polystyrene like polyvinyl acetate).

The trimethyl-ol propane triacrylate (TMPTA) is a trifunctional acrylate monomer, serving to promote cross-linking in this mixture. Other like (acrylate) cross-linking agents might be substituted, such as (trimethyl-ol trimethacrylate). Some such cross-linker will usually be used—to enhance coating strength, etc., as workers well know—preferably (another acrylate cross-linker).

Elimination of TMPTA or the Celrad (without replacing by equivalents) will tend to soften the cured overcoat and reduce shrinkage.

The 2-ethylhexyl acrylate (2-EHA, Celanese Corp.) is a mono-functional acrylate monomer, supplemental to the "3701" and added, here, to improve flexibility of the final polymer coat. Workers will recognize that other such diluents may be substituted such as isodecyl acrylate or styrene.

The "Irgacure 184" ("I-184"; Ciba Geigy) is a photo-initiator apt for such (UV) curing of such a mixture. This UV-initiator is found surprisingly (possibly uniquely) apt for such purposes, especially because it is surprisingly resistant to discoloration (yellowing) of the cured overcoat (e.g., when used in such a mixture as T-1, including Z-6020 as discussed below).

This is especially surprising because such discoloration (yellowing) does result when a closely-similar companion UV-initiator Irgacure #651 (by Ciba-Geigy also) replaces the Irgacure #184 (possibly because #651 has more unsaturated bonds and/or might include quinonidal endgroups; groups; cf. #184:αhydroxy-cyclo hexyl phenone; #651: 2,2-dimethoxy-2-phenyl acetophenone).

The Z-6020 (by Dow Corning) is a diamino primer added to T-1 to promote coating adhesion (to "soft pad" substrate) and also to clarify the coating (reduce "yellowing" or amber color otherwise resulting). This clarification is somewhat unexpected. The "yellowing" mechanism is not fully understood; hydroxyl groups may play a role.

For instance, replacement of Z-6020 with another conventional adhesion-promoter, (Z-6040 or Z-6030 are good), leaves the T-1 coating subject to yellowing.

Thus, it will be understood as critical to the desired results to employ an initiator like I-184 and an adhesion promoter like Z-6020.

MIX T-2

By contrast, elimination of Z-6020 in T-1 and replacement of I-184 with the mentioned I-651 yielded a coating (T-2) that exhibited decided "yellowing" under (ambient) conditions; also toughness was inferior. Viscosity was about 110 cp at 25° C., density 1.07 gm/cc.

MIX T-3

Now, replicating Mix T-2, but replacing I-651 with I-184, reduces the yellowing, but still leaves the coating with a light amber tone. This coating is tougher than that of T-2. A thickness of about 10 mils gave transmission of as high as 92.4% at 6328 A°.

MIX T-1

Now, adding Z-6020 to Mix T-3 to produce T-1, essentially eliminates all discoloration leaving a very clear, transparent coating).

This "promoter" (Z-6020) is believed to react with the moisture and hydroxyl groups in the mix solution. I believe it removes the amber colorant of the hydroxyl group. Tests indicate this T-1 film has much stronger adhesion to the substrate and maintains good flexibility. (after being in the environmental chamber for 50 hours at 7020 C. and 80% R.H., this film did not show any crack or delamination on the tri-layered disk).

That is, a disk with an overcoat film made with T-1 mix will pass severe environmental testing conditions (MIL-STD-810C). It can be placed in a chamber with conditions of 70° C. and 80% R.H. for 50 hours and will show no visible delamination or cracks at all.

The "FC-430" is a fluoropolymer "surfactant" additive (by 3M Co.) characterized as a "non-ionic surfactant" for organic polymeric coating systems. It is added to promote good wetting, leveling and spreading functions and as a flow control agent, being adapted for reducing surface tension of certain coatings on certain substrates. It is promoted as being very non-reactive and as compatible with water-based or solvent-based systems (and with most polymers). "FC-430" might, with certain adjustments, be replaced by a like surfactant such as zonyl FSN by DuPont.

The Mixture T-1 should be "viscosity adjusted" to optimize spreading and disk application; here, final viscosity should be about 41 cp (25° C., density: 1.07 gm/cc), given the subject ambient conditions (room temperature, fluoropolymer substrate surface, etc.).

The T-1 formulation (and similar mixtures) is quite tolerant of any number of other additives of widely varying chemistry; so, where appropriate, these may be added (e.g., an anti-static agent).

Curing

With the material spread evenly across the subject disk (fluoropolymer) surface and essentially all oxygen driven-off (e.g., by $N_2$ or like inert pre-flush, etc., as detailed below), the coating is photo-cured by exposure to ultraviolet light for a few minutes while the disk is slowly rotated. This renders a good fully-cured "hard"

overcoating (no supplemental heat needed, no aging time necessary for complete polymerization).

More particularly, and preferably, a nitrogen pre-flush is invoked (e.g., for about 1 minute to drive off all oxygen); then exposure, under nitrogen, to UV for about 3-5 minutes, or sufficient to cure the coating as desired. Preferably, this is done while slowly rotating the disk (e.g., 20 rpm; note: the preferred UV beam falls mostly in $\lambda 0.3$ to 0.4 um. range, with intensity varying with $\lambda$—e.g., 50 mW/cm$^2$ for 3.5 minutes at 0.366 um. —longer if less initiator is used).

Workers will recognize that other related techniques and/or materials and associated adjustments may be substituted in appropriate cases, taking care to assure adequate stability (over extended archival life) and to avoid inducing stress cracks or decomposition of materials.

Radiation-curing is preferred over other (superficially-related) methods. For instance, thermal curing is unduly complex and hard to control; also it uses more energy and introduces solvent pollution risks.

Results

Mixture T-1, when so applied on a disk, (fluoropolymer surface) and so cured, will be seen to provide a hard clear protective coating, essentially satisfying all of the mentioned subject requirements; e.g., resisting moisture intrusion (and associated swell-cracking, shrinkage), with fine optical clarity and exhibiting good scratch resistance, while being easily surface cleaned.

Moisture resistance was particularly surprising and impressive—e.g., though not 100% impermeable, this hard coat will exhibit no swell-cracking even after extended immersion in water. Similarly, the hard overcoat has been observed to withstand extended extreme temperature/humidity cycling (e.g., from room temperature to 140° C. and from about 40% humidity up to 80% humidity, for many weeks).

Further, this Hard outer-coating will be observed to exhibit extended stability—e.g., withstanding extended exposure to a rather extreme temperature/humidity cycling. This "stability" and associated toughness, etc., is believed to derive from the relatively cross-linked, long-chain polymer (epoxy) groups produced.

Also, this hard coat adheres (satisfactorily) to the fluoropolymer "soft pad", as is desired. Such adhesion might not result where the hard coat and/or the "soft pad" were changed—in such a case, a separate intermediate compatible (e.g., fully transparent) "adhesive inter-layer" might be called-for; however it is disfavored (e.g., it complicates thickness control).

EXAMPLE II

Example I is repeated, except that proportions are modified as below (Mix T-4); otherwise it is similarly formulated, applied and cured.

| Mix T-4 | Parts by wt. |
| --- | --- |
| Celrad 1700 | 17 |
| Celrad 3200 | 17 |
| TMPTA | 32 |
| 2-EHA (ethylhexyl acrylate) | 31 |
| FC-430 | 1 |
| Darocur 1173 (vs. I-184) | 2 |
| | 100 |

Results

The results were essentially like those in Example I, except that the overcoat was more brittle and more prone to moisture intrusion and "swell-cracking". Compared with T-1, this mix gave a coating with much less ultimate tensile strength (e.g., ~2000 psi; vs. about 4000 psi with T-1).

EXAMPLE III

Another alternative Mix, T-5, is formulated, applied and cured as with T-1.

| Mix T-5 | Parts by wt. |
| --- | --- |
| RDX-52225 | 39 |
| TRPGDA (Celanese) | 39 |
| N-VP (GAF) | 14 |
| Methyl diethanolamine | 3 |
| Irgacure 651 | 5 |
| | 100 |

Results

Essentially as with T-1, except for improved surface hardness, but with orange peel on the surface.

Disfavored formulations

Somewhat surprisingly, certain similar "radiation-cured acrylic" mixtures do not seem practical and are disfavored for the instant purposes. For instance, a formulation like Mix T-6 below will not be sufficiently clear and transparent (at the contemplated 0.4-0.8 um. wavelengths).

Mix T-6

Mix T-1 is replicated, except that Z-6030 replaces the Z-6020 "adhesion promoter".

Results

Clarity badly impaired; Z-6020 evidently incompatible with the other ingredients.

Coating methods

Following are examples of novel techniques for depositing "hard coating" mixtures like those in the foregoing Examples onto OD disk substrates (like fluoropolymer) to yield an outer protective overcoat thereof—especially one that is several mils thick, yet highly-uniform, is radiation-cured in situ, giving the mentioned environmental and other protection for such a disk over a prescribed extended life. Workers will recognize that these techniques emphasize convenient, cost-effective methods of coating and curing, with very close control of thickness, and thickness uniformity.

While the subject coating is applied to give a highly uniform thickness of about 7 mils, workers will appreciate that thicknesses of up to about 20 mils can be satisfactorily rendered.

Workers will recognize that "hard coat formulations" like those described are quite apt for a "spiral" method of application (e.g., to an OD disk, as below) according to another feature hereof, such material lending itself to such surprising simplicity and ease of dispensing, yet under close control and yielding the described surprisingly precise control of thickness uniformity.

Formulation T-1 will now be understood as to be applied to the OD disk surface f in FIG. 1 in a certain preferred spiral fashion. This will be understood as an aluminum disk on which the described tri-layer optical recording structure has been applied and, over this, a layer of fluoropolymer (or of a like "soft pad" polymeric surface).

In general, the method will be seen as involving the deposition of the coating material on the prescribed (fluoropolymer) disk surface in a prescribed number of spiral rows, or "beads" so the beads are spread out, or "leveled" into a very smooth, very uniform coating; and thereafter curing and hardening this coating to render the desired "Hard" protective overcoat. Some particular and preferred forms of this application method will now be described.

Example M-1: Application of T-1 to fluoropolymer substrate

Step #1 Mix preparation

A preferred form of the novel coating method will now be described wherein a preferred Hard coating mix (preferably T-1 described above), will be understood as selected, prepared and disposed for application to the disk in a spiral row of uniform symmetrical "beads", being thereafter "leveled" by a prescribed wetting (to induce a rapid, highly-uniform "leveling" of the beads on the prescribed surface) with the disk contemporaneously rotated slowly—i.e., just fast enough to induce inter-merging of adjacent beads.

Step #2: Dispense as "Spiral Beads"

Figure 2:
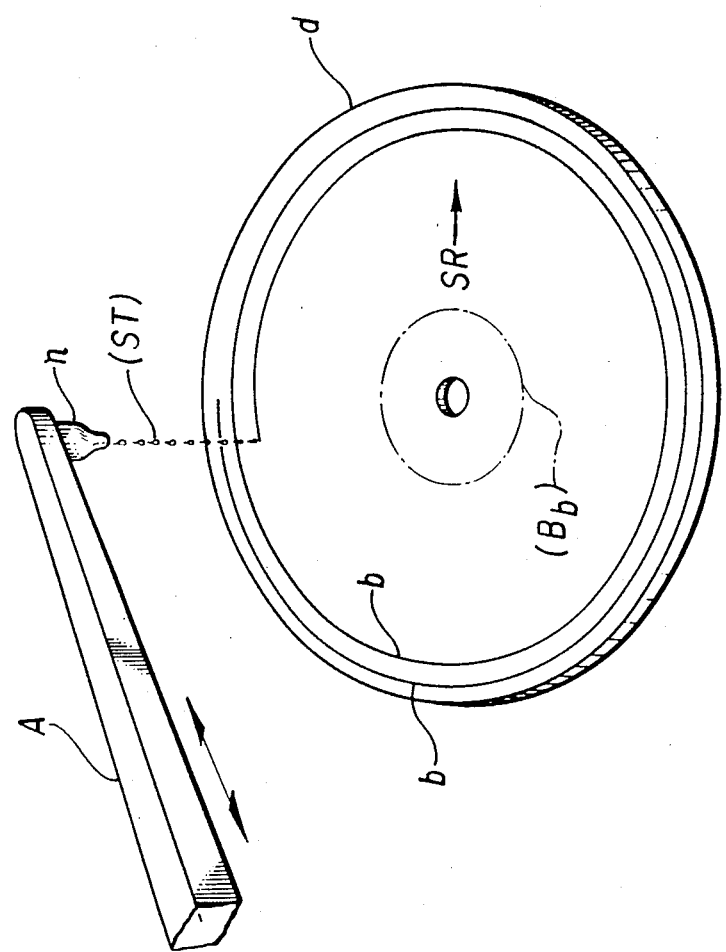
FIG. 2 very schematically indicates a preferred method of applying overcoat material of the kind taught herein.

More particularly, and with illustrative reference to FIG. 2, Mix T-1 will be supplied as known by workers to a prescribed controlled-rate dispensing means n (like a syringe-nozzle n, as workers know) affixed on a reciprocable arm A. Nozzle n is adapted and controlled (by known means) to dispense a prescribed, carefully-controlled, uniform stream st of the mi-.x down onto the receiving (fluoropolymer) surface on the subject disk d at a constant rate. The while arm A will be understood as to be continuously shifted radially (inward) of disk d, carefully controlled so that this stream st moves radially of disk d while the disk rotates whereby to describe the specified spiral SR (e.g., arm A translated by a linear motor as with magnetic recording heads—maintaining uniform separation, and size, of the beads). Disk rpm may also be varied, as necessary, (see below). As workers will appreciate, one may vary one or several of the three variables of: disk rpm, arm velocity and dispensing rate, while keeping the other variables constant—to deliver uniform size beads.

Thus, nozzle n is controllably swept across a prescribed radius of disk d, as the disk is rotated, deploying mix in the continuous uniform spiral SR (of "bead" segments b being of uniform separation, size and shape, as workers in the art will appreciate). The Mix may be supplied to nozzle n via a known syringe pump (not detailed), arranged to dispense at a prescribed rate to form such a spiral (e.g., at 1–3 gm/min. yielding about 40 beads across a 3.5"radial band $B_b$).

Control of mix viscosity is found to be very important to get good distribution and uniform settling.

Care should be taken to avoid "holidays" or "pinholes" (voids where little or nO solvent condenses, giving a different "wetting" there or none at all—note: increased ambient temperature seems to enlarge such voids, probably because too much solvent evaporates too fast).

Step #2-A: bead-leveling

The technique of applying such a precisely-uniform polymer coating (thickness of 170+10 um) on a fluoropolymer surface is difficult. The following procedure is a preferred method of overcoating via a spinning technique. The spinning process includes the dispensing of coating solutions on a spinning substrate followed by leveling and curing. To have a uniform coating we dispense the exact amount of coating solution at low spin speed (preferably 4–16 rpm here) on the substrate surface in a spiral fashion. It is important that this coating solution properly "wet" this substrate surface; this is controlled by the viscosity and the surface tension of the coating solution and by the surface tension of the substrate surface material, as well as by outward-spreading forces (the effect of the centrifugal force induced by spinning the disk-substrate).

The coating beads on each track will be laid down so as to "just barely" touch one another and thus wet the entire surface. The while, spinning rpm should be carefully controlled such that the coating solution will not move radially-outward appreciably (under the influence of centrifugal force) yet so the surface tension forces and centrifugal force will overcome the retarding coating viscosity and thus spread the coating solution uniformly.

Because the surface tension of a fluoropolymer is quite low, such an applied coating solution is apt to "wet" only very slowly. To improve and accelerate such wetting, we maintain a relatively low flow-rate (from the dispensing syringe), with a relatively high spinning rpm during dispensing—leading to a relatively large number of relatively "thin" beads (spiral track) on the substrate, with adjacent beads kept tangent to one another and the substrate so-wetted more quickly and completely (across its entire surface).

The dispensing rate may be kept, for instance, at a constant 1 gr./min. to 3 gr./min. One possible problem is that the flow stream (bead spiral) will not be continuous unless the syringe tip is kept relatively close to the (disk) substrate. Thus, to render a continuous spiral track using a tip with 0.033" ID, one must keep this distance between the tip and the coating surface to about 170–250 um. The tip can now help spread-out the dispensed drops and level them. This was observed to work quite successfully.

The dispensing tip was translated radially (i.e., relatively to the center of the spinning substrate) so as to lay down enough beads (tracks) to cover the entire surface. In addition to so controlling radial translation speed, disk rpm (spinning speed) was also varied relatively continuously from 4 rpm at the OD to 11 rpm at the ID (so the tangential velocity will be for all tracks, from outside to inside radially) this prevents from "oversplitting".

Step #3: Cure

After the entire substrate is so covered with coating, the disk is preferably spun-up to enhance (facilitate, accelerate) leveling (here about 4 rpm for about 7 minutes is satisfactory). The coating may then be cured; e.g., 3 minutes under ambient (UV) conditions; then another 3 minutes UV exposure under a $N_2$ environment. Such an initial "air-cure" (first 3 min.) is preferred to avoid "wrinkling". We find, surprisingly, that if the initial UV cure takes place in an N₂ atmosphere, the top of the coating is apt to retard penetration of the shorter wavelengths and become "wrinkled"—evidently because its "base" then cures less (or more slowly—e.g., it may remain "fluid" longer).

With leveling complete and the coating thus evenly distributed across the face of disk d, it will now be cured, in situ, (and otherwise treated) to yield the desired hard protective overcoating. Thus, disk rotation may cease and the disk be subjected to curing conditions—preferably without moving it from the "coating station", lest coating uniformity be disturbed or contaminants be introduced (e.g., dust settle on the now-tacky surface).

UV curing may be invoked at a curing station. That is, with the material evenly spread across the subject disk surface, the coating is photo-cured by exposure to ultraviolet light "under air"; then under an inert atmosphere (e.g., N₂ flush to expel all oxygen) until the coating is properly cured and "hard". We find about 3 minutes total exposure to 0.3–0.4 um UV (e.g., 50 mW/cm² intensity at 0.366 um) "in air"; then a like exposure "under N₂" is quite satisfactory.

Alternatively, workers will understand that other like curing methods (e.g., other radiation) may be used in certain instances, with appropriate adjustments (e.g., of the type, concentration of photoinitiator).

Results

As mentioned before, the thickness uniformity is quite excellent (on the order of ±168–182 um. over a 3.5"band for a "nominal 7 mil" coating is impressive, especially in view of the simplicity of the application apparatus and the type of coating mixture involved). As mentioned, the cure times and temperatures are quite convenient, as are the rest of the treatment conditions.

Example M-2 (SiO₂ flash on fluoropolymer)

Whatever bead application technique is used, it may be advisable to pre-treat the substrate as suggested elsewhere to enhance wetting, adhesion and related characteristics. For instance, in Example M-1 above, or a modification thereof, one may wish to enhance the hydrophilicity of the substrate and the wetting thereto of the T-1 beads. In such a case, we have found it advantageous to apply or etch a very transparent "flash" coating of SiO₂ on the fluoropolymer prior to applying the beads (of T-1 or the like, cf. SiO₂ on layer f of FIG. 1).

Figure 3:
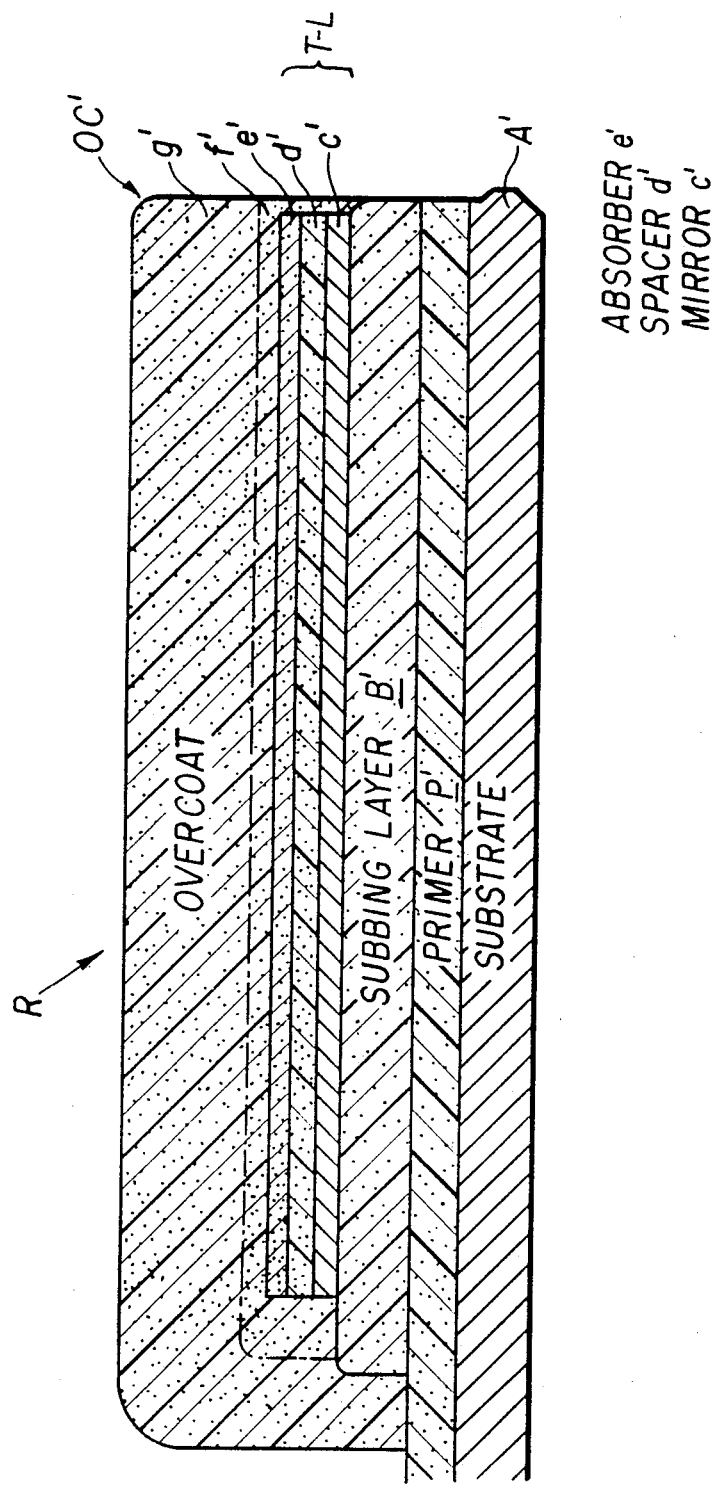
FIG. 3 is a view after the manner of FIG. 1 indicating a modified embodiment.

"Encapsulated" record, FIG. 3

FIG. 3 depicts a modified record R' in the manner of FIG. 1 and with all elements thereof identical (prime-designation) in structure, material and fabrication to R_D except as otherwise stated. Here, the substrate disk A' is smoothed with a primer coat P' and subbing layer B', on which a mirror layer c' is laid, with a spacer d' atop mirror c' and absorber layer e' atop the spacer. A similar Hard/Soft overcoat OC' is applied atop the absorber e', except that it is made to surround and "encapsulate" the sensitive layers and so enhance archival life. Thus, soft pad coating f' extends beyond the recording tri-layer T-L' and along the exposed periphery of layers e', d', c' (protectively sealing the outer edges and interfaces thereof) to bond with the radially extended outer portion of subbing B'. In like fashion, Hard overcoat layer g' is preferably extended radially beyond soft layer f' and subbing B', and down along their outer peripheral edges—sealingly —to bond with extended outer portions of disk A', or primer P' thereon.

Alternative uses

Workers will recognize that one may prepare and apply such a "Hard" coating to other, somewhat different, surfaces, such as on a modified "soft pad" coating. And, even where the substrate surface is radically different (e.g., a silicone elastomer), workers will recognize that an "otherwise-unsuitable" substrate may be pre-coated or otherwise treated, in certain instances, to accommodate application of a "Hard" overcoat as above. For instance, in the plastic coating and converting arts, ways are known for treating a wide variety of polymeric substrates to enhance their "wettability". Such may, in appropriate instances, be adopted and combined with the invention.

It will be understood that the preferred embodiments described herein are only exemplary, and that the invention is capable of many modifications and variations in construction, arrangement and use without departing from the spirit of the invention.

For example, "Hard" outer coatings like those here taught may, of course, be used to cover and protect other substrates for like purposes; and may be applied in other than the described "spiral" coating methods and may be applied in other than the described "spiral" coating methods (and with other materials, with appropriate adjustments). And such coating structures may in appropriate instances be otherwise rendered—e.g., deposit a "soft pad" onto a "Hard coating" substrate (e.g., onto an epoxy acrylate disk), then deposit the absorber onto soft pad, then deposit spacer/reflector, etc., onto absorber as required; and, finally, applying adhesive and press-bonding this onto associated "Winchester disk", or like "carrier".

Further modifications of the invention are also possible. For example, the means and methods disclosed herein are also applicable to "soft pad" coated recording tape, floppy disks and the like. Also, the present invention is applicable for providing a like protective outer coating for media used in other forms of recording and/or reproducing systems, such as those in which data is recorded and/or reproduced using exposure with different radiation.

The above examples of possible variations of the present invention are merely illustrative. Accordingly, the present invention is to be considered as including all possible modifications and variations coming within the scope of the invention as defined by the appended claims.

What is claimed is:

1. A radiation-recording element comprising:
   a substrate having a prescribed carrier surface;
   a radiation-sensitive recording structure disposed on said surface; and
   protective bi-functional cover means laid over this structure, the cover means comprising a "soft pad" overcoating relatively transparent to the radiation laid over the structure, operatively adjacent thereto, plus a relatively hard radiation-cured acrylic, non-yellowing protective outerseal coating over the "soft pad", this outer-seal coating being comprised, predominantly, of acrylated resin together with a non-yellowing photo-initiator and a non-yellowing adhesion promoter;
   this recording structure including an absorber layer adapted to record data bits at selected "write-site"

portions of said layer when subjected to a write-radiation beam of prescribed energy and wavelength, at least some of the material in each given "write-site" being adapted to deform and/or to be translated somewhat when so subjected to the write beam; this absorber layer comprising laser-responsive metallic material adapted to so write by forming an "optical hole" creating a local discontinuity in optical read-out properties when each "write-site" is subjected to said radiation write-beam;

the "soft pad" overcoating comprising a layer of "soft polymer" deposited on the absorber layer, and formulated and applied to offer little or no resistance to such deformation/translation during such writing; this polymer layer being covered with a relatively hard protective acrylated epoxy outer-seal material which is firmly bonded thereto and is also relatively transparent to the radiation beam; said outer-seal material including at least one photo-cured acrylate monomer or pre-polymer as the bulk resin, this said adhesion-promoter being selected and adapted to be a clarifying, non-yellowing amino-type material adapted to assist in clarifying the resultant coating, and to coact with the initiator in such clarification; the initiator constituting a hydroxy cyclo-hexyl phenone.

2. A record disk adapted for a high bit density "thermal" recording for computer digital information storage, and intended for use over relatively long archival life with a given write beam of prescribed wavelength range and intensity range from a prescribed radiation source, this disk comprising in combination:

a substrate having a recording face exhibiting prescribed optical and thermal characteristics under the given beam; having a reflector film thereon exhibiting high reflectivity at said wavelength range; and having a thickness of dielectric spacer-insulator material overlying said reflector film and exhibiting high transparency to said wavelength range;

with an information layer of "transition material" applied on this insulator material, this layer being selected, deposited, and arranged so the reflectivity thereof will be significantly altered by said write beam at each write-site;

plug transparent protective cover means including a "soft pad" overcoating overlying this transition material, being adapted to tend to isolate each selected write-site thereon, mechanically and thermally, whereby to extend archival life while enhancing sensitivity; and also including a relatively hard protective outer-seal coating about several mils thick, over the "soft pad", and including at least one radiation-cured acrylate monomer or pre-polymer as the essential bulk resin, plus an associated non-yellowing photoinitiator of hydroxy cyclo-hexyl phenone, plus a nonyellowing, clarifying, amino-based adhesion-promoter and related coating-constituents;

the pre-polymer entities constituting clear, high molecular weight acrylate plus proportionate related low molecular weight compatible organic diluent, with a multifunctional acrylate cross linker;

this adhesion-promoter being selected and adapted to include moieties acting to so clarify the coating by combining with the initiator and with aqueous and/or other hydroxyl groups.

3. A record disk for use with a recording beam providing prescribed recording radiation of a given frequently, this disk comprising:

a record-layer of radiation-absorbing material overlying a disk substrate; plus a "soft-pad" over this record layer; and a protective, extended-life, UV-cured acrylated epoxy outer-seal coating of relatively high thickness-uniformity over this "soft-pad", this coating being relatively transparent to the recording-radiation and comprising the radiation-polymerization product of a coating formulation including at least one radiation-cured unsaturated resin, plus an associated non-yellowing epoxy-type UV initiator, plus a related, clarifying, non-yellowing amino-based adhesion-promoter and related coating-constituents; this coating serving as a mechanical/chemical barrier and seal over the soft pad;

this soft pad being a transparent, inert buffer overcoat comprising yielding polymeric material overlying the record-layer material such that it is constrained little, or not at all in the course of being written-upon with said radiation, said the outer-seal coating covering all exposed outer portions of said "soft pad" overcoat;

said adhesion-promoter being selected and adapted to be non-yellowing as well as to assist in clarifying the resultant coating.

4. The combination as recited in claim 3, wherein the adhesion promoter is selected and adapted to include moieties acting to so clarify the coating by combining with the initiator and with aqueous and/or other hydroxyl groups, the initiator being a hydroxy cyclo-hexyl phenone.

* * * * *

UNITED STATES PATENT AND TRADEMARK OFFICE
CERTIFICATE OF CORRECTION

PATENT NO. : 4,981,743

DATED : January 1, 1991

INVENTOR(S) : Wu-Jing Ho

It is certified that error appears in the above-identified patent and that said Letters Patent is hereby corrected as shown below:

Col. 24, line 62, "outerseal" should be ---outer-seal---.

Col. 26, line 7, "nonyellowing" should be ---non-yellowing---.

Col. 26, ll. 19-20, "frequently" should be ---frequency---.

Signed and Sealed this

Twenty-first Day of July, 1992

Attest:

DOUGLAS B. COMER

Attesting Officer      Acting Commissioner of Patents and Trademarks